# United States Patent Office 2,802,037
Patented Aug. 6, 1957

2,802,037
METHOD OF PREPARING HEXAHALOBENZENES

Charles J. Pennino, Hudson, Ohio, assignor to The B. F. Goodrich Company, New York, N. Y., a corporation of New York No Drawing. Application March 29, 1954,
Serial No. 419,580

7 Claims. (Cl. 260—650)

This invention relates to a method of preparing polyhalo-aromatic compounds and more particularly refers to a method of preparing hexahalobenzenes by exposing octahalocyclohexenones to a temperature of about 200° C. or higher.

It is extremely difficult to prepare hexahalobenzenes by direct halogenation of benzene. These compounds are therefore usually made by indirect methods. One process of making hexachlorobenzene, reported in J. A. C. S. 68, 142 (1946), calls for exhaustive chlorination of phthalic anhydride for 90 hours at a temperature of 170–256° C. and continuing the chlorination for an additional 50 hours at the higher temperature level.

Another method requires the chlorination of $CH_2Cl_2$ at a temperature of 400–700° C. to yield a mixture of chlorinated hydrocarbons.

Asphaltenes can be chlorinated at 200° C. to 500° C. to produce a complex mixture containing some hexachlorobenzene.

Small amounts of hexachlorobenzene are formed when hexachloroprene is pyrolyzed at a temperature of at least 490° C.

Each of these prior methods of preparing hexahalobenzenes has a serious drawback in that it is either very time consuming, yields very low conversions of the desired end product or yields a mixture of products that require costly separation steps.

An object of this invention is the provision of a method of preparing hexahalobenzenes by the pyrolysis of octahalocyclohexenones.

Another object is the provision of a method of preparing hexachloro- and hexabromobenzenes and hexahalobenzenes containing both chlorine and bromine atoms attached to ring carbon atoms, by pyrolyzing the proper octahalocyclohexenones at a temperatures of about 200° C. or higher.

Still another object is the provision of a method of preparing hexachlorobenzene by pyrolyzing octachlorocyclohexenone at temperatures of from about 200° C. to about 325° C.

Numerous other objects will be apparent from the detailed description which discloses a preferred embodiment of the invention.

The objects of my invention are accomplished by heating, to a temperature of about 200° C. or above an octahalocyclohexenone having the empirical formula $C_6X_8O$, in which X represents chlorine or bromine and in which the oxygen is attached to a carbon atom to form a carbonyl linkage.

Specific examples of the octahalocyclohexenones that can be pyrolyzed to prepare hexahalobenzenes include 2,3,4,4,5,5,6,6 - octachlorocyclohexen - 2 - one - 1; 2,2, 3,4,5,5,6,6 - octachlorocyclohexen - 3 - one - 1; 2,3,4, 4,5,5,6,6 - octabromocyclohexen - 2 - one - 1; 2,2,3,4,5, 5,6,6 - octabromocyclohexen - 3 - one - 1; 2,4,6 - tribromo - 2,3,5,5,6 - pentachlorocyclohexen - 3 - one - 1; 2,4,6 - tribromo - 3,4,5,5,6 - pentachlorocyclohexen - 2- one - 1; 2,4,6 - trichloro - 2,3,5,5,6 - pentabromocyclohexen - 3 - one - 1; 2,4,6 - trichloro - 3,4,5,5,6 - pentabromocyclohexen - 2 - one - 1 and other octahalogenated derivatives of cyclohexenones containing chlorine and bromine.

The mechanism of the conversion of an octahalocyclohexenone to a hexahalobenzene is not quite clear. However, it does involve the following phases (1) displacement of oxygen from a carbon atom by a halogen atom, and (2) the aromatization of the cyclohexenyl ring by the loss of halogen from the molecule, so that only one halogen atom remains attached to each carbon atom in the ring. The reaction can be described graphically by the following formula:

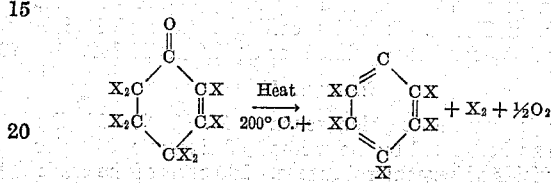

In these formulas X represents a halogen selected from the class consisting of chlorine and bromine.

The yields of hexahalobenzenes obtained by my process are approximately 50 mole percent based on the molar amount of octahalocyclohexenone used as a raw material. In addition to hexahalobenzene a compound having the empirical formula $(C_6X_4O)_n$ (where X represents chlorine, or bromine) is formed. The latter derivative crystallized from nitrobenzene as white needles and had a melting point of 320–321° C.

The time needed for the conversion of the starting materials to the hexahalobenzene is usually not more than about three hours, and is frequently less depending on the rate of heating and the pyrolysis temperature. In any event, the conversion does not begin until a temperature of about 200° C. is attained but a temperature as high as the reflux temperature can be used.

The reaction is preferably carried out at atmospheric pressure. Super-atmospheric or sub-atmospheric pressures are also operable, but these latter procedures require special or auxiliary equipment and also require special handling techniques.

Octahalocyclohexenones can be prepared by exhaustively halogenating phenol or a partially halogenated phenol at temperatures up to about 140° C. Generally, a chlorination catalyst is desirable. A particularly effective method of preparing octachlorocyclohexenone is described in U. S. Patent 2,662,918.

The hexahalobenzenes are very useful in the control of wheat smuts. For this purpose, they are preferably applied to the plants as dusts or dilute aqueous emulsions.

The following detailed examples are intended to point out clearly the invention and are not intended as limiting the invention to the examples disclosed.

In all the examples the parts are by weight, unless indicated otherwise.

Example I 37.2 parts of purified octachlorocyclohexene-2-one-1 having a melting point of 101–103° C. was placed in glass apparatus and heated slowly, so that after three hours the temperature of the material undergoing pyrolytic decomposition reached 295° C. When the temperature reached about 200° C. small amounts of chlorine began to be evolved. The chlorine evolution was very vigorous and profuse between 210 and 295° C. After the chlorine emission was reduced, the temperature was raised slowly to 325° C., at which temperature the mixture was at reflux. Thereafter, the mixture was cooled, and extracted with hot alcohol. The alcohol insoluble material was extracted with hot benzene and yielded 14.2 parts, a 50% yield, of crystalline hexachlorobenzene, which after recrystallization from benzene had a melting point of 225–6° C. The crystalline hexachlorobenzene had the following composition on analysis:

|  | C | Cl |
|---|---|---|
| Calculated for $C_6H_6$ | 25.26 | 74.7 |
| Found | 25.41 | 74.5 |

The benzene insoluble fraction was a white powder which formed white, needle like crystals on recrystallization from nitrobenzene. This crystalline material had an M. P. of 320–321° C. On analysis it was found to have the empirical formula $C_6Cl_4O$ and may have been the dimer $(C_6Cl_4O)_2$. It had a carbon content of 30.6%. The carbon content calculated for $C_6Cl_4O_2$ is 31.3%.

*Example II*

Crude octachlorocyclohexenone (M. P. 60–63° C.) also can be treated by the method of Example I to give good yields of hexachlorobenzene. 200 parts of the crude raw material described above gave 75.6 parts of hexachlorobenzene (M. P. 220–3° C.) which is equivalent to a 50% yield, based on the starting ingredient. In addition 12.2 parts were formed of a compound having an M. P. of 324–6° C. when recrystallized from nitrobenzene. This latter material also had the empirical formula $C_6Cl_4O$.

Octabromocyclohexenones can be prepared by brominating phenol or a partially brominated phenol by the processes described for preparing octachlorocyclohexenone. Both the crude and the purified octabromocyclohexenones can be heated to 200–325° C. to produce approximately 50% yields of hexabromobenzene,

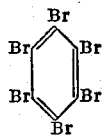

Octahalocyclohexenones containing both bromine and chlorine can be prepared in one of three ways.

In one method a partially brominated phenol, such as 2,4,6-tribromophenol for example, is chlorinated at a temperature of 120–140° C. in the presence of a catalyst and pre-formed octahalocyclohexenone. This method will produce a compound having three bromine and five chlorine atoms on the cyclohexenone ring. Another method is to prepare a partially-chlorinated phenol and then brominate the chlorophenol until a total of eight halogen atoms are present on the cyclohexenone ring.

A third method is to halogenate phenol or a partially halogenated phenol with a mixture of chlorine and bromine.

It is to be understood, however, that regardless of the particular halogen, selected from the class consisting of chlorine and bromine, that is present on the cyclohexenone nucleus and regardless of the position of the halogen on the nucleus, the octahalocyclohexenone will yield a hexahalobenzene on being heated to about 200° C. or above and preferably up to about 325° C. The hexahalobenzenes that are produced from compounds having both chlorine and bromine on the octahalocyclohexenone nucleus are usually mixtures of chloro-bromo hexahalobenzenes, all of which conform to the generic formula $C_6X_6$, where X is chlorine or bromine.

The exact structure of the end product depends in part on the position of the halogen in the octahalocyclohexenone. Thus, if a halogen is on an unsaturated carbon atom, it usually remains intact during the heating cycle. On the other hand, it is more difficult to predict which halogen will be stripped from the molecule or will replace the oxygen atom of the nucleus, since these effects depend on the relative stability of the carbon to halogen linkage, the reactivity of the halogen and the relative concentration of each halogen that is available for reaction. By way of illustration, an octahalocyclohexenone having the structure

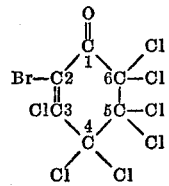

will form

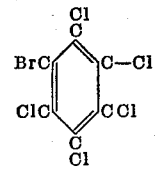

almost exclusively. If, however, a compound of the structure

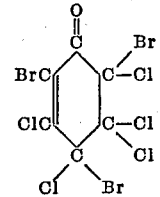

is employed as the starting material, a mixture of several hexahalobenzenes results. It is obvious that both chlorine and bromine will be stripped from the molecule to form an aromatic nucleus. The bromine atoms on the saturated carbon atoms are slightly more labile than the chlorine atoms, but the difference in lability is not of such scope that bromine is removed to the total exclusion of chlorine.

Both chlorine and bromine are available for displacing the oxygen in the carbonyl group, and both types of halogens will so react. Accordingly, the hexahalobenzenes can be 1-bromo-2,3,4,5,6-pentachlorobenzene, 1,2-dibromo-3,4,5,6-tetrachlorobenzene, 1,2,4-tribromo-3,5,6-trichlorobenzene, 1,2,3-tribromo, 4,5,6-trichlorobenzene and 1,2,4,6-tetrabromo-3,5-dichlorobenzene. Other octahalocyclohexenones containing chlorine and bromine will produce equivalent mixtures, if both chlorine and bromine are attached to saturated carbon atoms. Mixtures of octachlorocyclohexenones and octabromocyclohexenone will also undergo the same reaction, under the conditions described, to form mixtures of hexahalobenzenes.

As many apparently widely different embodiments of this invention may be made without departing from the spirit and scope thereof, it is to be understood that the invention is not limited to the specific examples herein, except as defined in the appended claims.

I claim:

1. A method of preparing hexahalobenzenes comprising exposing octahalocyclohexenone in which the halogen is selected from at least one member of the class consisting of chlorine and bromine to a temperature of at least about 200° C.

2. A method of preparing a mixture of hexahalobenzenes comprising exposing an octahalocyclohexenone containing only chlorine and bromine as the halogen atoms on the octahalocyclohexenone nucleus to a temperature of from about 200° C. to about 325° C.

3. A method of preparing hexachlorobenzene comprising exposing an octachlorocyclohexenone to a temperature of from about 200° C. to about 325° C.

4. A method of preparing hexabromobenzene comprising exposing an octabromocyclohexenone to a temperature of from about 200° C. to about 325° C.

5. The method of claim 1 in which the reaction is carried out at atmospheric pressure.

6. The method of claim 3 in which the reaction is carried out at atmospheric pressure.

7. A method of preparing hexachlorobenzene comprising exposing 2,3,4,4,5,5,6,6-octachlorocyclohexen-2-one-1 to a temperature of from about 200° C. to about 325° C.

No references cited.